Oct. 23, 1962   G. MORESSÉE ET AL   3,059,323
METHODS OF MAKING ARMATURE DISK ROTORS FOR ELECTRICAL MACHINES
Filed April 18, 1960

Inventors
Georges Moressée
Robert Déchet

By Pierce, Scheffler & Parker
Attorneys

United States Patent Office 3,059,323
Patented Oct. 23, 1962

3,059,323
METHODS OF MAKING ARMATURE DISK ROTORS FOR ELECTRICAL MACHINES
Georges Moressée, Neuilly-sur-Seine, and Robert Déchet, Boulogne-sur-Seine, France, assignors to Normacem S.A., Paris, France, a body corporate of France
Filed Apr. 18, 1960, Ser. No. 22,925
Claims priority, application France Apr. 30, 1959
5 Claims. (Cl. 29—155.53)

This invention relates generally to armature disk rotors for electrical machines, and more particularly to improved methods of making the same.

In many electrical machines—and particularly in axial air gap machines—a disk-type rotor is provided having a supporting insulation layer with coil turn sides of the electrical armature winding on both sides thereof, said rotor disk being rotatable between spaced stator elements.

In the prior art, flat radially-arranged metal conductors were individually secured to both sides of the insulation layer by known chemical, electro-chemical or mechanical processes. The ends of the conductors were joined by delicate bridging connections to form the armature winding coils. For example, apertures were cut in the insulation layer adjacent the ends of the coil sides and the walls of the apertures were lined with a conductive material—by electrolytic deposition for example—so that the coil side conductors on one side of the insulating layer were alternately electrically connected in series with the coil side conductors on the other side of the insulating layer to form the armature winding.

Other methods of connecting the coil turn sides on opposite sides of the supporting layer included the use of rivets or eyelets extending through the insulating layer to provide the electrical connection of the coil side conductors, and also the use of individual weld junctions between the ends of radial conductors which extended slightly beyond the inner and outer edges of an annular insulating supporting layer.

These known methods of manufacturing armature disk-type rotors have the drawback of requiring many expensive, time-consuming, high-precision operations, and also the reliability of such electrical connections between the coil side ends has proven to be relatively low. The known methods of manufacture thus do not readily lend themselves to mass-production industrial use, and the electrical safety of the connections is reduced during the passage of strong currents.

The present invention was developed to eliminate the above-mentioned drawbacks of the known methods of manufacture of disk-type armature disk windings.

According to the present invention, the inner and outer peripheral edges of a pair of unitary annular metal plates on opposite sides of an insulating layer are each joined together by continuous annular electrically-conducting joint means. Spaced transverse notches are then cut completely through the annular conducting joint means leaving a plurality of peripherally-spaced conductive tabs or teeth corresponding in number and position to the conductor sides which are formed from the annular metal plates, the conductive tabs or teeth constituting the sole electrical connections between the coil sides conductors on opposite sides of the insulating layer. The coil side conductors may be formed from the metal plates—by spot etching, vaporization, or cutting, for example—after the plates have been mounted upon the insulating layer, or the coil side conductors may be partially formed or cut out in the metal plates prior to assembly with the insulating layer, the notching operation referred to above serving also to sever the individual conductor coil sides from each other.

Thus the primary object of the present invention is to provide a method for manufacturing a disk-type armature rotor comprising of the steps of securing a pair of thin unitary annular metal plates to an annular insulation layer, joining the inner and outer peripheral edges of said plates to each other by continuous electrically-conductive annular joints, forming a plurality of peripherally-spaced notches in both of the electrically-conductive joints to form conductive tabs, and forming a plurality of generally radially-arranged coil side conductors in each of said metal plates, the coil side conductors on opposite sides of the insulation layer being alternately connected in series by said conductive tabs.

Another object of the invention is to provide a method for manufacturing a disk-type armature rotor comprising the steps of securing a pair of thin unitary annular metal plates to an annular insulation layer, said plates having spaced generally radially-arranged coil side conductors partially formed therein and held together by annular portions at the inner and outer peripheries of the plates, joining the inner and outer peripheral edges of said plates to each other by continuous electrically-conductive annular joints, and forming a plurality of peripherally-spaced notches in said electrically-conductive joints to form conductive tabs and simultaneously severing the annular edge portions of the plates holding the coil side conductors together so that the coil side conductors on opposite sides of the insulation layer will be alternately connected in series by said conductive tabs.

Other objects and advantages of the invention will become more apparent from a study of the following specification when considered in conjunction with the accompanying drawings in which.

Figure 1:
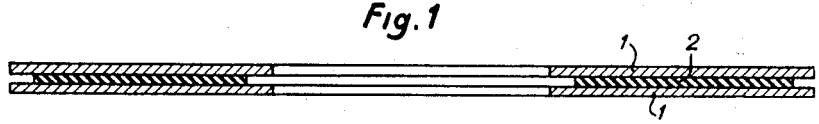
FIG. 1 is a diametric sectional view of the initial step in forming the armature disk blanks of FIGS. 2 and 3.
Figure 2:
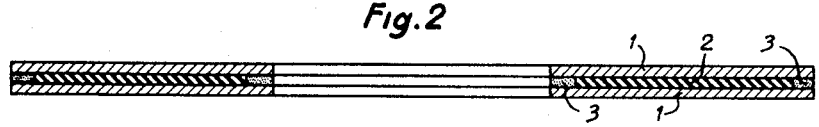
FIGS. 2 and 3 illustrate two armature disk blank embodiments formed from the laminated disk of FIG. 1.

Referring first to FIGS. 1 and 2, the laminated disk blank includes a pair of thin parallel, spaced annular metal plates 1 of electrically conductive material between which is positioned the annular insulating layer 2 of a synthetic plastic polymerizable resin. As shown in FIG. 1, the inner and outer peripheral edges of the plates 1 extend beyond the adjacent inner and outer peripheral edges of the insulating layer 2. Referring to FIG. 2, the spaces between the radially inwardly and outwardly extending edges of the plates 1 are filled with the continuous annular electrically-conductive rings 3 of suitable solder material. The material of the rings 3 is selected to have a melting point approximately equal to the temperature of polymerization of the resin so that upon the application of heat (and possibly with the simultaneous application of pressure) the resin will polymerize and the solder rings will melt whereby upon cooling, the plates 1 and the layer 2 will be bonded together firmly as a unit.

Figure 3:
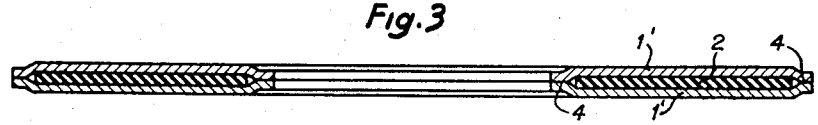

As an alternative, adjacently extending edges 4 of the plates 1' may be secured together autogeneously by the application of heat and pressure without the provision of a solder ring as shown in FIG. 3.

In both the embodiments of FIGS. 2 and 3 the electrically conductive plates will be electrically connected together at their inner and outer peripheral edges.

By a suitable known spot metal-removing process—such as etching, cutting, vaporization, etc.—radial slots are formed in the plates 1 (of FIG. 2) or 1' (of FIG. 3) to define the conductor coil sides of the armature disk winding. For example, radial slots 7 may be formed in the plates 1' of the blank of FIG. 3 to form the armature disk winding of FIG. 5. The ends of the conductor sides 6 at the inner and outer peripheral portions of the disk will, of course, be electrically joined by the tab portions 8a, 9a defined by the notches 8, 9 in the plate peripheral portions 4, so that one side of a winding turn will be on one side of the disk and the other side of the winding turn will be on the opposite side of the disk. The notches 8 and 9 will pass completely through the two adjacent peripheral portions 4 of the plates 1' so that the tab portions 8a, 9a extend radially outwardly and inwardly, respectively, in a toothlike manner.

Figure 5:
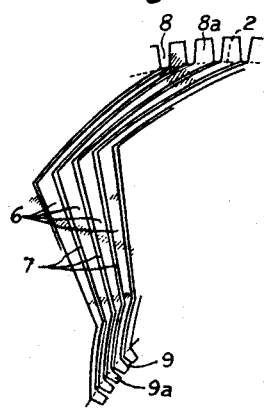
FIG. 5 is a detailed plan view of a portion of an armature disk manufactured from the blank of FIG. 3.

In the embodiment of FIG. 2, the notches in the plates 1 corresponding to the notches 8 and 9 of FIG. 5 would also extend completely through the solder rings 3 so that short circuiting of the coil sides will be positively avoided.

Figure 4:
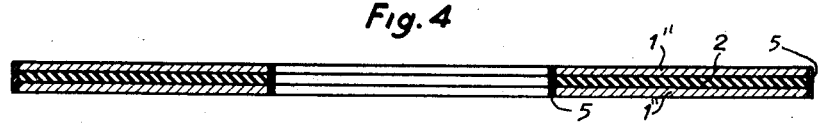
FIG. 4 is a diametric sectional view of another armature disk blank embodiment.

Referring now to the embodiment of FIG. 4, the annular plates 1" have the same inner and outer diameters as the annular insulating plate 2 and are secured thereto in a known manner. The inner and outer peripheral surfaces of the insulating layer 2 are then made conductive by any suitable known process, such as by the deposition of a metallic salt, for example. Electrical connection between the plates 1" at their inner and outer peripheries is then positively assured by the electrolytically deposited annular layers 5, the thicknesses of the deposits being such as to provide suitable strength and proper conduction of current. Slots are then formed in the plates 1" by suitable known processes referred to above to define the conductor winding sides in a manner similar to that shown in FIG. 5. The notches at the inner and outer peripheral portions of the disk will extend completely through the layers 5 similar to the notches 8 and 9 of FIG. 5.

While in accordance with the patent statutes we have illustrated and described the best forms and embodiments of the invention now known to us, it will be apparent to those skilled in the art that other changes and modifications may be made in the apparatus described without deviating from the invention defined in the following claims.

We claim:

1. The method of manufacturing a thin disk-type armature rotor for electrical machines which comprises the steps of coaxially arranging a pair of annular unitary thin metal plates of electrically conductive material on opposite sides of an annular insulation layer, joining adjacent inner and outer peripheral edges of said plates to each other by continuous electrically-conductive radially-extending annular joints, forming a plurality of peripherally-spaced notches in said electrically-conductive joints and extending completely transversely therethrough to define conductive tabs, and removing portions of metal from each of said plates to form a plurality of generally radially-arranged coil side conductors in alignment at their ends with said conductive tabs, the coil side conductors on opposite sides of the insulation layer being alternately connected in series by said conductive tabs.

2. The method as defined in claim 1 wherein the inner and outer peripheral edges of said plates extend radially beyond the adjacent inner and outer edges of said insulation layer, and further wherein the step of joining the adjacent inner and outer peripheral edges of said plates consists of soldering continuous annular rings of electrically conductive material between the portions of the peripheral edges of the plates which extend beyond said insulation layer.

3. The method as defined in claim 2 wherein said insulation layer consists of a polymerizable resin having a temperature of polymerization which is substantially equal to the melting temperature of the solder material.

4. The method as defined in claim 1 wherein the inner and outer peripheral edges of said plates extend radially beyond the adjacent inner and outer edges of said insulation layer, and further wherein the step of joining the adjacent inner and outer peripheral edges of said plates consists of autogeneously welding together the extending peripheral portions of said plates.

5. The method as defined in claim 1 wherein said annular plates and said annular insulation layer have the same inner and outer diameters, and further wherein the steps of joining adjacent inner and outer peripheral edges of said plates consists of depositing a layer of electrically conductive metal salt on the inner and outer peripheral surfaces of said annular insulation layer, and then electrolytically depositing layers of conductive material across the inner and outer peripheral surfaces of said plates and across the inner and outer metal salt layers on said insulation layer.

References Cited in the file of this patent

UNITED STATES PATENTS

| | | |
|---|---|---|
| 2,634,310 | Eisler | Apr. 7, 1953 |
| 2,762,113 | Daniels et al. | Sept. 11, 1956 |
| 2,886,880 | Eisler | May 19, 1959 |
| 2,993,135 | Henry-Baudot | July 18, 1961 |

OTHER REFERENCES

Product Engineering, "Printed-circuit Rotors," Burr et al., Mar. 16, 1959, McGraw-Hill Publishing Co. Inc.